(12) United States Patent
An et al.

(10) Patent No.: US 10,640,638 B2
(45) Date of Patent: May 5, 2020

(54) THERMOPLASTIC RESIN COMPOSITION, METHOD OF PREPARING THE SAME, AND MOLDED PART INCLUDING THE SAME

(71) Applicant: LG CHEM, LTD., Seoul (KR)

(72) Inventors: Yong Hee An, Daejeon (KR); Yong Yeon Hwang, Daejeon (KR); Hyun Taek Oh, Daejeon (KR); Bong Keun Ahn, Daejeon (KR); Min Jung Kim, Daejeon (KR); Chun Ho Park, Daejeon (KR); Eun Soo Kang, Daejeon (KR); Jang Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 63 days.

(21) Appl. No.: 16/302,038

(22) PCT Filed: Nov. 1, 2017

(86) PCT No.: PCT/KR2017/012237
§ 371 (c)(1),
(2) Date: Nov. 15, 2018

(87) PCT Pub. No.: WO2018/084558
PCT Pub. Date: May 11, 2018

(65) Prior Publication Data
US 2019/0382574 A1   Dec. 19, 2019

(30) Foreign Application Priority Data

Nov. 4, 2016 (KR) .................. 10-2016-0146832
Sep. 14, 2017 (KR) .................. 10-2017-0117722

(51) Int. Cl.
| | |
|---|---|
| *C08L 33/06* | (2006.01) |
| *C08J 3/20* | (2006.01) |
| *C08J 5/18* | (2006.01) |
| *B29B 9/06* | (2006.01) |
| *B29K 25/00* | (2006.01) |
| *B29K 33/00* | (2006.01) |
| *B29K 105/00* | (2006.01) |

(52) U.S. Cl.
CPC .............. *C08L 33/062* (2013.01); *C08J 3/201* (2013.01); *C08J 5/18* (2013.01); *B29B 9/06* (2013.01); *B29K 2025/08* (2013.01); *B29K 2033/12* (2013.01); *B29K 2105/0085* (2013.01); *C08J 2333/10* (2013.01); *C08J 2425/06* (2013.01); *C08J 2425/12* (2013.01); *C08J 2433/20* (2013.01); *C08J 2451/04* (2013.01); *C08L 2201/02* (2013.01); *C08L 2201/04* (2013.01); *C08L 2201/08* (2013.01); *C08L 2205/025* (2013.01); *C08L 2205/035* (2013.01)

(58) Field of Classification Search
CPC .......... C08L 25/12; C08L 33/12; C08L 51/04; C08L 25/06; C08L 2205/035; C08L 2205/025; C08L 2207/53
See application file for complete search history.

(56) References Cited

U.S. PATENT DOCUMENTS

| | | |
|---|---|---|
| 6,288,167 B1 | 9/2001 | Chen et al. |
| 2010/0075165 A1 | 3/2010 | Cho et al. |
| 2015/0005435 A1* | 1/2015 | Park ........................ C08L 25/12 524/504 |

FOREIGN PATENT DOCUMENTS

| | | |
|---|---|---|
| EP | 2818514 A1 | 12/2014 |
| JP | 2007152849 A | 6/2007 |
| KR | 1020070117315 A | 12/2007 |
| KR | 101199758 B1 | 11/2012 |
| KR | 1020140042380 A | 4/2014 |
| KR | 101444054 B1 | 10/2014 |
| KR | 20160057601 A | 5/2016 |
| WO | WO2015152468 A1 | 10/2015 |

OTHER PUBLICATIONS

International Search Report for PCT/KR2017/012237 dated May 31, 2018.
Search Report dated Jun. 14, 2019 for European Application No. 17866413.2.

* cited by examiner

*Primary Examiner* — Jeffrey C Mullis

(57) ABSTRACT

A thermoplastic resin composition with low gloss and improved colorability, pencil hardness and wear resistance has (A) 5 to 35% by weight of a first graft copolymer having an average particle diameter of 50 to 150 nm and containing acrylate rubber as a core; (B) 10 to 40% by weight of a second graft copolymer having an average particle diameter of more than 150 nm and 800 nm or less and containing acrylate rubber as a core; (C) 5 to 15% by weight of an aromatic vinyl compound-vinyl cyanide compound copolymer having a weight average molecular weight of 70,000 to 130,000 g/mol; (D) 20 to 50% by weight of an aromatic vinyl compound-(meth)acrylate compound copolymer having a weight average molecular weight of 65,000 to 100,000 g/mol; and (E) 0.1 to 7% by weight of a syndiotactic polystyrene resin.

15 Claims, No Drawings

THERMOPLASTIC RESIN COMPOSITION, METHOD OF PREPARING THE SAME, AND MOLDED PART INCLUDING THE SAME

TECHNICAL FIELD

Cross-Reference to Related Applications

This application is a U.S. National Stage of PCT/KR2017/012237 filed Nov. 1, 2017, which claims priority to Korean Patent Application No. 10-2016-0146832, filed on Nov. 4, 2016, and Korean Patent Application No. 10-2017-0117722, re-filed on Sep. 14, 2017, in the Korea Intellectual Property Office, the disclosure of each of which is incorporated herein by reference.

The present invention relates to a thermoplastic resin composition, a method of preparing the same, and a molded part including the same, and more particularly, to a thermoplastic resin composition having excellent low gloss, colorability, and pencil hardness and improved wear resistance, a method of preparing the same, and a molded part including the same.

Background Art

In general, an acrylonitrile-styrene-acrylate (ASA) copolymer containing an alkyl acrylate rubber polymer is a typical thermoplastic resin having excellent weather resistance and aging resistance. Resins having excellent weather resistance and aging resistance are used in various fields, such as automobiles, ships, leisure goods, building materials, and garden goods, and demand for such resins is rapidly increasing.

In addition, products prepared using ASA resins are mostly glossy, and products prepared by extruding ASA resins exhibit surface gloss within a high gloss range (90 gloss at 75°) or a medium gloss range (60 gloss at 75°). In recent years, however, there has been increase in demand for low gloss resins that may produce an elegant atmosphere due to increase in demand of users for emotional products. In addition, as environmental problems have arisen, there is a tendency to use matte resins prepared by a method in which a matte painting process or a pad covering process is omitted. Accordingly, a method of preparing such low gloss resins, wherein large diameter rubber particles or a quencher is added to improve low gloss characteristics, has been disclosed. However, when the above material is added in small amounts, low gloss characteristics are not sufficiently exhibited, whereas, when the above material is added in excessive amounts, impact strength is significantly reduced.

In addition, when a resin is used as a sheet, the resin should have excellent colorability and wear resistance to have an aesthetically pleasing appearance, and the degree of gloss of the resin needs to be appropriately adjusted so that abrasion is not conspicuous even when abrasion occurs.

RELATED ART DOCUMENT

[Patent Document] (Patent Document 1) KR 10-1444054 B1 (registered on Sep. 17, 2014)

DISCLOSURE

Technical Problem

Therefore, the present invention has been made in view of the above problems, and it is one object of the present invention to provide a thermoplastic resin composition, a method of preparing the same, and a molded part including the same, wherein the thermoplastic resin composition includes two types of graft copolymers each containing acrylate rubber as a core and each having different average particle diameters, an aromatic vinyl compound-vinyl cyanide compound copolymer having a specific range of weight average molecular weight, and an aromatic vinyl compound-methacrylate compound copolymer having a specific range of weight average molecular weight. According to the present invention, the thermoplastic resin composition has excellent mechanical properties, such as impact strength and flexural strength, and improved low gloss, colorability, and wear resistance.

The above and other objects can be accomplished by the present disclosure described below.

Technical Solution

In accordance with one aspect of the present invention, provided is a thermoplastic resin composition, including (A) 5 to 35% by weight of a first graft copolymer having an average particle diameter of 50 to 150 nm and containing acrylate rubber as a core; (B) 10 to 40% by weight of a second graft copolymer having an average particle diameter of more than 150 nm and 800 nm or less and containing acrylate rubber as a core; (C) 5 to 15% by weight of an aromatic vinyl compound-vinyl cyanide compound copolymer having a weight average molecular weight of 70,000 to 130,000 g/mol; (D) 20 to 50% by weight of an aromatic vinyl compound-(meth)acrylate compound copolymer having a weight average molecular weight of 65,000 to 100,000 g/mol; and (E) 0.1 to 7% by weight of a syndiotactic polystyrene resin.

Advantageous Effects

As apparent from the foregoing, the present invention advantageously provides a thermoplastic resin composition having excellent mechanical properties, such as impact strength and flexural strength, and improved low gloss, colorability, and wear resistance, a method of preparing the same, and a molded part including the same.

BEST MODE

Hereinafter, the thermoplastic resin composition, the method of preparing the same, and the molded part including the same according to the present invention will be described in detail.

The present inventors confirmed that, when a thermoplastic resin composition includes two types of graft copolymers each containing acrylate rubber as a core and each having different average particle diameters, an aromatic vinyl compound-vinyl cyanide compound copolymer having a specific range of weight average molecular weight, and an aromatic vinyl compound-(meth)acrylate compound copolymer having a specific range of weight average molecular weight, the wear resistance of the thermoplastic resin composition was improved, and the thermoplastic resin composition had excellent low gloss, colorability, and pencil hardness. Based on these results, the present invention was completed.

The thermoplastic resin composition of the present invention includes (A) 5 to 35% by weight of a first graft copolymer having an average particle diameter of 50 to 150 nm and containing acrylate rubber as a core; (B) 10 to 40% by weight of a second graft copolymer having an average particle diameter of more than 150 nm and 800 nm or less and containing acrylate rubber as a core; (C) 5 to 15% by weight of an aromatic vinyl compound-vinyl cyanide compound copolymer having a weight average molecular weight of 70,000 to 130,000 g/mol; (D) 20 to 50% by weight of an aromatic vinyl compound-(meth)acrylate compound copolymer having a weight average molecular weight of 65,000 to 100,000 g/mol; and (E) 0.1 to 7% by weight of a syndiotactic polystyrene resin.

(A) First Graft Copolymer

For example, the first graft copolymer (A) may have an average particle diameter of 50 to 150 nm and contain acrylate rubber as a core.

For example, the average particle diameter of the first graft copolymer may be 50 to 150 nm, 80 to 150 nm, or 110 to 140 nm. Within this range, gloss and colorability may be excellent.

In addition, the average particle diameter of the acrylate rubber may be, for example, 30 to 150 nm, 40 to 140 nm, or 100 to 130 nm. Within this range, gloss, impact resistance, and wear resistance may be excellent.

For example, the first graft copolymer may be included in an amount of 5 to 35% by weight, 7 to 30% by weight, or 15 to 30% by weight, preferably 17 to 25% by weight, with respect to the total weight of the thermoplastic resin composition. Within this range, wear resistance may be improved.

For example, the first graft copolymer may be obtained by graft-polymerizing 20 to 60% by weight of an aromatic vinyl compound and 5 to 40% by weight of a vinyl cyanide compound onto 30 to 70% by weight of an acrylate rubber core.

Alternatively, the first graft copolymer may be, for example, obtained by graft-polymerizing 20 to 40% by weight of an aromatic vinyl compound and 10 to 30% by weight of a vinyl cyanide compound onto 40 to 60% by weight of an acrylate rubber core. Within this range, mechanical properties, such as impact strength and flexural strength, may be excellent, and low gloss, colorability, and wear resistance may be improved.

As another example, the first graft copolymer may be obtained by graft-polymerizing 25 to 35% by weight of an aromatic vinyl compound and 15 to 25% by weight of a vinyl cyanide compound onto 45 to 55% by weight of an acrylate rubber. Within this range, mechanical properties, such as impact strength and flexural strength, may be excellent, and low gloss, colorability, and wear resistance may be improved.

In the present disclosure, the graft copolymer refers to a copolymer having a core-shell structure including a rubber core and a shell surrounding the rubber core.

For example, the acrylate rubber may be alkyl acrylate rubber.

For example, the alkyl acrylate rubber may be acrylate rubber having an alkyl group having 1 to 10 carbon atoms. As a specific example, the alkyl acrylate rubber may be one or more selected from the group consisting of ethyl acrylate rubber, propyl acrylate rubber, butyl acrylate rubber, hexyl acrylate rubber, octyl acrylate rubber, and 2-ethylhexyl acrylate rubber, preferably butyl acrylate rubber. In this case, gloss and colorability may be excellent.

For example, the aromatic vinyl compound may be one or more selected from the group consisting of styrene, α-methyl styrene, p-methyl styrene, 2,4-dimethyl styrene, and vinyl toluene, preferably styrene.

For example, the vinyl cyanide compound may be one or more selected from the group consisting of acrylonitrile, methacrylonitrile, and ethacrylonitrile.

For example, the first graft copolymer may have a gel content of 50 to 100% or 60 to 90%, preferably 60 to 75%. Within this range, mechanical properties, such as impact strength and flexural properties, may be excellent, and wear resistance may be improved.

For example, the first graft copolymer may have a swelling index of 6 to 14 or 6 to 12, preferably 6 to 10. Within this range, mechanical properties, such as impact strength and flexural properties, may be excellent, and wear resistance may be improved.

For example, the gel content and swelling index used in the present invention can be obtained in the following manner. Acetone is added to 1 g of graft copolymer powder, followed by stirring at room temperature for 24 hours. Then, centrifugation is performed to obtain only an acetone-insoluble portion. The weight of the portion before/after drying is measured, and the gel content and swelling index can be calculated using the following equation.

Gel content (%)=(weight after drying after centrifugation/sample weight)×100

Swelling index=weight before drying after centrifugation/weight after drying after centrifugation In addition, the degree of grafting of the first graft copolymer may be 20 to 80% or 25 to 60%, preferably 25 to 40%. Within this range, mechanical properties, such as impact strength and flexural properties, may be excellent, and wear resistance may be improved.

For example, the degree of grafting used in the present invention can be obtained in the following manner. The resin latex of a graft polymer is solidified, washed, and dried to obtain a powder. 300 ml of acetone is added to 2 g of the powder, followed by stirring for 24 hours. Then, the solution is subjected to ultracentrifugation to separate an acetone solution. Methanol is added to the separated acetone solution to obtain a non-grafted portion. After drying, the weight of the dried non-grafted portion is measured. The degree of grafting can be calculated using the following equation.

Degree of grafting (%)=(weight of grafted monomer (g)/weight of rubber(g))×100

(B) Second Graft Copolymer

For example, the second graft copolymer (B) may have an average particle diameter of more than 150 nm and 800 nm or less and contain acrylate rubber as a core.

For example, the second graft copolymer may have an average particle diameter of more than 150 nm and 800 nm or less, 300 to 700 nm, or 450 to 600 nm. Within this range, impact resistance and flexural strength may be excellent.

In addition, the average particle diameter of the acrylate rubber may be, for example, 100 to 600 nm or 250 to 600 nm, preferably 350 to 500 nm. Within this range, gloss, impact resistance, and wear resistance may be excellent.

For example, the second graft copolymer may be included in the thermoplastic resin composition in an amount of 10 to 40% by weight or 15 to 35% by weight, preferably 25 to 30% by weight. Within this range, wear resistance may be improved.

For example, the second graft copolymer may be obtained by graft-polymerizing 20 to 60% by weight of an aromatic vinyl compound and 5 to 40% by weight of a vinyl cyanide compound onto 30 to 70% by weight of an acrylate rubber core.

Alternatively, the second graft copolymer may be, for example, obtained by graft-polymerizing 20 to 40% by weight of an aromatic vinyl compound and 10 to 30% by weight of a vinyl cyanide compound onto 40 to 60% by weight of an acrylate rubber core. Within this range, low gloss, colorability, and wear resistance may be improved.

As another example, the second graft copolymer may be obtained by graft-polymerizing 25 to 35% by weight of an aromatic vinyl compound and 15 to 25% by weight of a vinyl cyanide compound onto 45 to 55% by weight of an acrylate rubber core. Within this range, mechanical properties, such as impact strength and flexural strength, may be excellent, and low gloss, colorability, and wear resistance may be improved.

For example, the second graft copolymer may have a gel content of 50 to 100% or 70 to 90%, preferably 80 to 90%. Within this range, mechanical properties, such as impact strength and flexural strength, may be excellent, and wear resistance may be improved.

For example, the swelling index of the second graft copolymer may be 6 to 14 or 6 to 12, preferably 6 to 10. Within this range, mechanical properties, such as impact strength and flexural strength, may be excellent, and colorability and wear resistance may be improved.

In addition, the degree of grafting of the second graft copolymer may be, for example, 20 to 100% or 40 to 80%, preferably 45 to 60%. Within this range, mechanical properties, such as impact strength and flexural properties, may be excellent, and wear resistance may be improved.

For example, the acrylate rubber may be alkyl acrylate rubber.

For example, the alkyl acrylate rubber may be acrylate rubber having an alkyl group having 1 to 15 carbon atoms. As a specific example, the alkyl acrylate rubber may be one or more selected from the group consisting of ethyl acrylate rubber, propyl acrylate rubber, butyl acrylate rubber, hexyl acrylate rubber, octyl acrylate rubber, and 2-ethylhexyl acrylate rubber, preferably butyl acrylate rubber. In this case, impact resistance and flexural strength may be excellent.

For example, the aromatic vinyl compound may be one or more selected from the group consisting of styrene, α-methyl styrene, p-methyl styrene, 2,4-dimethyl styrene, and vinyl toluene, preferably styrene.

For example, the vinyl cyanide compound may be one or more selected from the group consisting of acrylonitrile, methacrylonitrile, and ethacrylonitrile.

For example, the total content of rubber contained in the first graft copolymer and the second graft copolymer may be 10 to 30% by weight with respect to 100% by weight of the total thermoplastic resin composition. Within this range, mechanical properties may be excellent.

Specifically, the total content of the rubber may be, for example, 15 to 30% by weight, 20 to 27% by weight, or 22 to 25% by weight with respect to 100% by weight of the total thermoplastic resin composition. Within this range, mechanical properties may be excellent.

For example, the weight ratio of the first graft copolymer to the second graft copolymer may be 1:0.5 to 1:2 or 1:0.6 to 1:1.5, preferably 1:1.25 to 1:1.5. Within this range, low gloss and wear resistance may be excellent.

In the present invention, the first graft copolymer may be prepared by performing emulsion graft polymerization of an aromatic vinyl compound and a vinyl cyanide compound onto an acrylate rubber polymer having an average particle diameter of 30 to 150 nm, without being limited thereto. The polymerization method is described in detail below.

First, an acrylate rubber polymer having an average particle diameter of 30 to 150 nm (hereinafter, referred to as "small diameter acrylate rubber polymer") included in the first graft copolymer may be prepared by performing emulsion polymerization of acrylate monomers. Specifically, the small diameter acrylate rubber polymer may be prepared by mixing acrylate monomers, an emulsifier, an initiator, an electrolyte, and water and performing emulsion polymerization of the mixture. As another example, the small diameter acrylate rubber polymer may be prepared by mixing acrylate monomers, an emulsifier, an initiator, a grafting agent, a crosslinking agent, an electrolyte, and water and performing emulsion polymerization of the mixture. The prepared small diameter acrylate rubber polymer may be in a latex form.

For example, the acrylate monomer is preferably butyl acrylate, ethylhexylacrylate, or a combination thereof, more preferably butyl acrylate. The acrylate monomer is preferably used in an amount of 30 to 70% by weight with respect to the total weight of the first graft copolymer. Within this range, the object of the present invention may be achieved more easily.

In addition, the emulsifier is preferably an aqueous solution having a pH of 3 to 9 and containing an alkylsulfosuccinic acid metal salt derivative having 12 to 18 carbon atoms, or an alkyl sulfate having 12 to 20 carbon atoms or a sulfonic acid metal salt derivative thereof. Specifically, the alkylsulfosuccinic acid metal salt derivative having 12 to 18 carbon atoms contained in the aqueous solution having a pH of 3 to 9 is preferably sodium dicyclohexyl sulfosuccinate, sodium dihexyl sulfosuccinate, sodium bis(2-ethylhexyl) sulfosuccinate, potassium bis(2-ethylhexyl)sulfosuccinate, or lithium bis(2-ethylhexyl)sulfosuccinate, and the alkyl sulfate having 12 to 20 carbon atoms or the sulfonic acid metal salt derivative thereof is preferably sodium lauryl sulfate, sodium dodecyl sulfate, sodium dodecylbenzene sulfate, sodium octadecyl sulfate, sodium oleic sulfate, potassium dodecyl sulfate, or potassium octadecyl sulfate. The amount of the emulsifier used is preferably 1 to 4 parts by weight, more preferably 1.5 to 3 parts by weight with respect to the total weight of the small diameter acrylate rubber polymer.

In addition, for example, the initiator is preferably an inorganic or organic peroxide. Specifically, the initiator is preferably a water-soluble initiator, such as potassium persulfate, sodium persulfate, and ammonium persulfate or a fat-soluble initiator, such as cumene hydroperoxide and benzoyl peroxide. The amount of the initiator used is preferably 0.05 to 0.2 parts by weight with respect to the total weight of the small diameter acrylate rubber polymer.

In the present invention, the total weight of the acrylate rubber polymer may be the weight of the prepared acrylate rubber polymer itself, or the total weight of monomers added when polymerization is performed to prepare the acrylate rubber polymer.

In addition, for example, the grafting agent is preferably allyl methacrylate, triallyl isocyanurate, triallylamine, or diallylamine, and is preferably used in an amount of 0.01 to 0.07 parts by weight with respect to the total weight of the small diameter acrylate rubber polymer. Within this range, the object of the present invention may be achieved more easily.

In addition, for example, the crosslinking agent is preferably ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, or trimethylolmethane triacrylate, and is preferably used in an amount of 0.02 to 0.3 parts by weight with respect to the total weight of the small diameter acrylate rubber polymer.

When the grafting agent and the crosslinking agent are used to prepare the acrylate rubber polymer according to the present invention, elasticity may be further increased, and physical properties, such as impact strength, may be further improved.

In addition, the electrolyte is preferably $NaHCO_3$, $Na_2S_2O_7$, or $K_2CO_3$, and is preferably used in an amount of 0.05 to 0.4 parts by weight with respect to the total weight of the small diameter acrylate rubber polymer.

In addition, the water serves as a medium in which emulsion polymerization proceeds, and is preferably deionized water, and the amount thereof may be selectively adjusted as needed.

For example, each of the components may be continuously fed during polymerization or may be fed into a reactor in such a manner that continuous feed and batch feed are used together, and may be polymerized. In addition, the small diameter acrylate rubber polymer may be prepared using emulsion polymerization conditions commonly known in the art to which the present invention pertains.

For example, the pH of the prepared small diameter acrylate rubber polymer is preferably 5 to 9, more preferably 6 to 8 in the latex state immediately after polymerization. Within this range, the stability of the prepared latex may be increased.

In addition, for example, the average particle diameter of the small diameter acrylate rubber polymer is preferably 30 to 150 nm, or 40 to 140 nm, more preferably 100 to 130 nm. When the average particle diameter of the rubber polymer is less than 30 nm, mechanical properties, such as impact strength and tensile strength, may be deteriorated. When a large amount of emulsifier is used, thermal stability may be decreased. When the average particle diameter of the rubber polymer is more than 150 nm, colorability may be deteriorated.

For example, the small diameter acrylate rubber polymer may be mixed with an aromatic vinyl monomer, a vinyl cyan monomer, and, when necessary, a polymerization additive, and emulsion polymerization may be performed to form a first graft copolymer in which a copolymer composed of an aromatic vinyl monomer and a vinyl cyan monomer is grafted onto the backbone of the acrylate rubber polymer.

For example, the polymerization additive may include a grafting agent and/or a crosslinking agent, which are the same as the grafting agent and the crosslinking agent used in the above-described small diameter acrylate rubber polymer. The grafting agent and the crosslinking agent may be used in the same parts by weight with respect to 100 parts by weight of the total monomers excluding rubber.

When the first graft copolymer is prepared, in addition to the small diameter acrylate rubber polymer, the aromatic vinyl monomer, and the vinyl cyan monomer, an emulsifier, a polymerization initiator, a molecular weight modifier, and water, which are commonly used in the art to which the present invention pertains, may be used depending on application. Accordingly, the first graft copolymer may be in the form of a latex.

Specifically, the emulsifier is preferably an aqueous solution having a pH of 9 to 13 and containing a carboxylic acid metal salt derivative such as a fatty acid metal salt having 12 to 20 carbon atoms and a rosin acid metal salt having 12 to 20 carbon atoms.

For example, the fatty acid metal salt having 12 to 20 carbon atoms is preferably sodium fatty acid, sodium laurate, sodium oleate, or potassium oleate, and the rosin acid metal salt having 12 to 20 carbon atoms is preferably sodium rosinate or potassium rosinate. For example, the emulsifier is preferably used in an amount within a range of 1 to 2 parts by weight with respect to 100 parts by weight of a reaction mixture used to prepare the first graft copolymer, including the small diameter acrylate rubber polymer, the aromatic vinyl monomer, and the vinyl cyan monomer.

In addition, as the polymerization initiator, for example, the same initiator as the initiator used to prepare the small diameter acrylate rubber polymer may be used. For example, the polymerization initiator is preferably used in an amount of 0.05 to 0.3 parts by weight with respect to 100 parts by weight of the reaction mixture of the first graft copolymer.

In addition, t-dodecyl mercaptan or n-octyl mercaptan may, for example, be used as the molecular weight modifier. The molecular weight modifier is preferably used in an amount of 0.02 to 0.2 parts by weight with respect to 100 parts by weight of the reaction mixture of the first graft copolymer.

In addition, the water is preferably deionized water, and is preferably used in an amount commonly used in the art to which the present invention pertains with respect to 100 parts by weight of the reaction mixture of the first graft copolymer.

In preparation of the first graft copolymer, that is, in graft polymerization, when the reaction mixture and the additives are added in a batch, the pH of a polymerization system is temporarily increased, which makes grafting difficult and lowers the stability of copolymer particles, so that the internal structure of the particles becomes nonuniform. Therefore, when the first graft copolymer is prepared by graft polymerization, the reaction mixture and the additives are preferably continuously added, for example, continuously for 1 to 10 hours.

When necessary, the first graft copolymer may be prepared by performing emulsion polymerization of the added reaction mixture and additives using polymerization conditions commonly known in the art to which the present invention pertains.

For example, the pH of the first graft copolymer is preferably 8 to 11, more preferably 9 to 10.5 in the latex state immediately after polymerization. Within this range, latex stability may be increased.

For example, the content of the first graft copolymer including the small diameter acrylate rubber polymer may be 5 to 35% by weight with respect to the total weight of the thermoplastic resin composition according to the present invention. When the copolymer is contained in an amount within this range, fluidity during processing of a product may be improved, and impact strength after molding may be improved. The content of the copolymer is preferably 7 to 30% by weight, more preferably 15 to 30% by weight. When the content of the first graft copolymer is more than 35% by weight, fluidity, hardness, and scratch resistance may be deteriorated. When the content of the first graft copolymer is less than 5% by weight, mechanical properties may be deteriorated.

In the present invention, the second graft copolymer may be prepared by performing emulsion graft polymerization of an aromatic vinyl monomer and a vinyl cyan monomer onto an acrylate rubber polymer having an average particle diameter of 100 to 600 nm, without being limited thereto. The polymerization method is described in detail below.

First, an acrylate rubber polymer having an average particle diameter 100 to 600 nm (hereinafter, "large diameter acrylate rubber polymer") included in the second graft copolymer may be, for example, prepared by performing emulsion polymerization of acrylate monomers. As a specific example, the large diameter acrylate rubber polymer may be prepared by mixing acrylate monomers, an emulsifier, an initiator, a grafting agent, a crosslinking agent, an electrolyte, and water and performing emulsion polymerization of the mixture.

For example, the acrylate monomer may be the same as the acrylate monomer used in preparation of the small diameter acrylate rubber polymer, and is preferably used in an amount of 10 to 60% by weight with respect to the total weight of the large diameter acrylate rubber polymer.

In addition, the emulsifier may be, for example, the same as the emulsifier used in preparation of the small diameter acrylate rubber polymer, and is preferably used in an amount of 0.1 to 1 part by weight with respect to the total weight of the large diameter acrylate rubber polymer.

In addition, an initiator, a grafting agent, a crosslinking agent, an electrolyte, and water used in preparation of the large diameter acrylate rubber polymer may be the same as those used in preparation of the small diameter acrylate rubber polymer, and the amount of each of the components used in both cases may be the same.

For example, each of the components may be continuously fed into a reactor or may be fed into a reactor in such a manner that continuous feed and batch feed are used together, and the large diameter acrylate rubber polymer may be prepared by performing emulsion polymerization of the components using polymerization conditions commonly known in the art to which the present invention pertains. Thus, the large diameter acrylate rubber polymer may be in the form of a latex.

For example, the pH of the prepared large diameter acrylate rubber polymer is preferably 5 to 9, more preferably 6 to 8 in the latex state immediately after polymerization. Within this range, the stability of the latex may be increased.

In addition, for example, the average particle diameter of the large diameter acrylate rubber polymer is preferably 100 to 600 nm or 250 to 600 nm, more preferably 450 to 600 nm. When the average particle diameter of the large diameter acrylate rubber polymer is less than 100 nm, mechanical properties, such as impact strength and tensile strength, may be difficult to maintain. On the other hand, when the average particle diameter is more than 600 nm, fluidity, processability, and gloss may be deteriorated, which is undesirable.

As a specific example, the large diameter acrylate rubber polymer may be mixed with an aromatic vinyl monomer, a vinyl cyan monomer, and a polymerization additive, and emulsion graft polymerization of the mixture may be performed to prepare the second graft copolymer in which a copolymer composed of the aromatic vinyl monomer and the vinyl cyan monomer is grafted onto the backbone of the large diameter acrylate rubber polymer. Thus, the second graft copolymer may be in the form of a latex.

At this time, description of the polymerization additive may include description of the polymerization additive of the first graft polymer described above.

For example, when the second graft copolymer is prepared, the large diameter acrylate rubber polymer is preferably used in an amount of 30 to 70% by weight with respect to the total weight of the second graft copolymer including the large diameter acrylate rubber polymer. Within this range, impact strength is excellent, and the degree of grafting is increased, so that hardness and scratch resistance may be improved.

In addition, an aromatic vinyl monomer, a vinyl cyan monomer, an emulsifier, a polymerization initiator, and a molecular weight modifier used in preparation of the second graft copolymer may be the same as those used in preparation of the first graft copolymer, and the amount of each of the components used in both cases may be the same.

In preparation of the second graft copolymer, that is, in graft polymerization, when the reaction mixture and the additives are added in a batch, the pH of a polymerization system is temporarily increased, which makes grafting difficult and lowers the stability of copolymer particles, so that the internal structure of the particles becomes nonuniform. Therefore, when graft polymerization is performed, the reaction mixture and the additives are preferably continuously added, for example, continuously for 1 to 10 hours.

When necessary, the second graft copolymer may be prepared by performing emulsion polymerization of the added reaction mixture and additives using polymerization conditions commonly known in the art to which the present invention pertains.

For example, the pH of the second graft copolymer is preferably 8 to 11, more preferably 9 to 10.5 in the latex state immediately after polymerization. Within this range, the stability of the latex may be increased.

For example, the content of the second graft copolymer may be 10 to 40% by weight with respect to the total weight of the thermoplastic resin composition. When the second graft copolymer is used in an amount of less than 10% by weight, impact strength may be deteriorated. On the other hand, when the second graft copolymer is used in an amount of more than 40% by weight, the degree of grafting is lowered, such that hardness and scratch resistance may be deteriorated. Thus, the content of the second graft copolymer is preferably 15 to 35% by weight, more preferably 25 to 30% by weight.

As a specific example, the first graft copolymer latex and the second graft copolymer latex are coagulated at 80 to 90° C., or 85° C. and at atmospheric pressure in an aqueous solution of calcium chloride, and then are dehydrated by aging at a temperature of more than 90° C. and 100° C. or less, or 95° C., followed by washing. Then, drying is performed using hot air at 85 to 95° C., or 90° C. for 20 minutes to 1 hour, or 30 minutes to obtain a powder.

(C) Aromatic Vinyl Compound-Vinyl Cyanide Compound Copolymer

For example, the weight average molecular weight of the aromatic vinyl compound-vinyl cyanide compound copolymer may be 70,000 to 130,000 g/mol, 80,000 to 120,000 g/mol, or 90,000 to 110,000 g/mol. Within this range, pencil hardness, wear resistance, and colorability may be improved.

For example, the aromatic vinyl compound-vinyl cyanide compound copolymer may be included in an amount of 5 to 15% by weight, preferably 7 to 13% by weight, with respect to the total weight of the thermoplastic resin composition. Within this range, wear resistance may be improved.

For example, the aromatic vinyl compound-vinyl cyanide compound copolymer may be one or more selected from the group consisting of a styrene/acrylonitrile copolymer, an α-methylstyrene/acrylonitrile copolymer, an α-methyl styrene/styrene/acrylonitrile copolymer, a styrene/methyl methacrylate copolymer, and a styrene/maleic anhydride copolymer, preferably an α-methyl styrene/acrylonitrile copolymer, an α-methyl styrene/styrene/acrylonitrile copolymer, or a combination thereof.

For example, the vinyl cyanide compound may be one or more selected from the group consisting of acrylonitrile, methacrylonitrile, and ethacrylonitrile, preferably acrylonitrile.

In addition, the aromatic vinyl compound-vinyl cyanide compound copolymer may be, for example, prepared using bulk polymerization. As a specific example, based on 100 parts by weight of total monomers used, 26 to 30 parts by weight of toluene may be used as a solvent and 0.1 to 10 parts by weight of di-t-dodecylmercaptan may be used as a molecular weight modifier. Polymerization may be performed in a continuous process manner, while the supply amount of the mixed solution of these reactants is controlled so that reaction time is from 2 to 4 hours, and reaction temperature is maintained at 140 to 170° C.

For example, in the aromatic vinyl compound-vinyl cyanide compound copolymer, the aromatic vinyl compound may be included in an amount of 50 to 90% by weight or 50 to 80% by weight, preferably 55 to 77% by weight, and the vinyl cyan compound may be included in an amount of 10 to 50% by weight or 20 to 50% by weight, preferably 23 to 45% by weight. Within this range, mechanical properties, such as impact strength and flexural strength, and wear resistance may be improved.

For example, the glass transition temperature (Tg) of the aromatic vinyl compound-vinyl cyan compound copolymer may be 100 to 130° C. or 115 to 125° C., preferably 120 to 125° C. Within this range, pencil hardness, wear resistance, and colorability may be improved. For example, the glass transition temperature may be measured using a differential scanning calorimeter.

(D) Aromatic Vinyl Compound-(Meth)Acrylate Compound Copolymer

For example, the aromatic vinyl compound-(meth)acrylate compound copolymer may have a weight average molecular weight of 65,000 to 100,000 g/mol, 70,000 to 95,000 g/mol, or 80,000 to 90,000 g/mol. Within this range, pencil hardness, wear resistance, and colorability may be excellent.

For example, the aromatic vinyl compound-(meth)acrylate compound copolymer may be included in an amount of 20 to 50% by weight or 25 to 47% by weight, preferably 36 to 42% by weight, with respect to the total weight of the thermoplastic resin composition. Within this range, wear resistance may be improved.

For example, the aromatic vinyl compound-(meth)acrylate compound copolymer may be obtained by polymerizing 65 to 85% by weight of a (meth)acrylate compound and 15 to 35% by weight of an aromatic vinyl compound.

As another example, the aromatic vinyl compound-(meth)acrylate compound copolymer may include 60 to 85% by weight of a methacrylate compound, 1 to 35% by weight of an aromatic vinyl compound, and 0.1 to 15% by weight of a vinyl cyanide compound. Within this range, mechanical properties, such as impact strength, may be excellent, and wear resistance may be improved.

Alternatively, the aromatic vinyl compound-(meth)acrylate compound copolymer may include, for example, 67 to 85% by weight of a (meth)acrylate compound, 5 to 32% by weight of an aromatic vinyl compound, and 0.1 to 10% by weight of a vinyl cyanide compound. Within this range, mechanical properties, such as impact strength, may be excellent, and wear resistance may be improved.

As another example, the aromatic vinyl compound-(meth)acrylate compound copolymer may include 70 to 80% by weight of a (meth)acrylate compound, 10 to 25% by weight of an aromatic vinyl compound, and 1 to 10% by weight of a vinyl cyanide compound. Within this range, mechanical properties, such as impact strength, may be excellent, and wear resistance may be improved.

For example, the (meth)acrylate compound may be one or more selected from the group consisting of methyl acrylate, ethyl acrylate, methyl methacrylate, ethyl methacrylate, methyl ethacrylate, ethyl ethacrylate, propyl acrylate, isopropyl acrylate, butyl acrylate, propyl methacrylate, isopropyl methacrylate, butyl methacrylate, and isobutyl methacrylate.

In the present invention, weight average molecular weight is measured using gel permeation chromatography (GPC).

(E) Syndiotactic Polystyrene Resin

The steric structure of the syndiotactic polystyrene resin is a syndiotactic structure. That is, the resin has a steric structure in which phenyl groups or substituted phenyl groups, which are side chains, are alternately located in the opposite direction with respect to a main chain formed by carbon-carbon bonds.

For example, the syndiotactic polystyrene resin may be included in an amount of 0.1 to 7% by weight or 1 to 5% by weight, preferably 3 to 5% by weight, with respect to the total weight of a thermoplastic resin composition. Within this range, low gloss may be excellent.

For example, the syndiotactic polystyrene resin may be a syndiotactic polystyrene, a derivative of a syndiotactic polystyrene, or a mixture thereof.

For example, the syndiotactic polystyrene may be one or more selected from the group consisting of diene polystyrene having tacticity of 85% or more, pentad (racemic pentad) polystyrene having tacticity of 35% or more, polyhalogenated styrene, polyalkoxystyrene, polyalkylstyrene, polybenzoic acid ester styrene, and a copolymer mainly composed of the compounds. Within this range, the objects of the present invention may be easily achieved.

For example, the derivative of the syndiotactic polystyrene may be one or more selected from the group consisting of syndiotactic polyhalogenated styrene, syndiotactic polyalkoxystyrene, syndiotactic polyalkylstyrene, syndiotactic polybenzoic acid ester styrene, syndiotactic polystyrene anhydrous maleic acid (sPS-MAH), carboxyl terminal-syndiotactic polystyrene (sPSCOOH), anhydrous maleic acid-syndiotactic polystyrene (sPS-MAH), maleic acid-syndiotactic polystyrene (sPS-MA), fumaric acid-syndiotactic polystyrene (sPS-FA), glycidyl methacrylate-syndiotactic polystyrene (sPS-GMA), and a copolymer mainly composed of the compounds. Within this range, the objects of the present invention may be easily achieved.

For example, when the tacticity of the syndiotactic polystyrene resin is 90% or more or 97% or more, preferably 99% or more, when measured by 13 C-NMR, low gloss and wear resistance may be excellent.

In addition, the melting temperature of the syndiotactic polystyrene resin may be, for example, 240 to 300° C. or 260 to 280° C. Within this range, low gloss and wear resistance may be improved. Melting temperature may be measured using, for example, a differential scanning calorimeter.

For example, the thermoplastic resin composition may further include one or more additives selected from the group consisting of an anti-dripping agent, a flame retardant, an antimicrobial agent, an antistatic agent, a stabilizer, a release agent, a heat stabilizer, an inorganic additive, a lubricant, an antioxidant, an ultraviolet light stabilizer, a light stabilizer, a pigment, a dye, and an inorganic filler.

For example, the lubricant may be ethylene bis-stearamide, oxidized polyethylene wax, magnesium stearate, or combinations thereof, and may be used in an amount of 0.1 to 5 parts by weight or 0.5 to 2 parts by weight, preferably 0.5 to 1.5 parts by weight, with respect to 100 parts by weight of the total amount of (A), (B), (C), (D), and (E)

components. Within this range, desired effects may be easily achieved without deteriorating the physical properties of the composition.

For example, the antioxidant may be a phenolic antioxidant or a phosphate antioxidant. Specifically, the antioxidant may be octadecyl-β-(3,5-di-t-butyl-4-hydroxyphenyl)propionate, tris(2,4-di-t-butylphenyl)phosphite, or the like, and may be used in an amount of 0.1 to 5 parts by weight or 0.5 to 2 parts by weight, preferably 0.5 to 1 part by weight, with respect to 100 parts by weight of the total amount of (A), (B), (C), (D), and (E) components. Within this range, desired effects may be easily achieved without deteriorating the physical properties of the composition.

The ultraviolet light stabilizer may be an ultraviolet light stabilizer commonly used in the art to which the present invention pertains. Specifically, the ultraviolet light stabilizer may be bis(2,2,6,6-tetramethyl-4-piperidyl)sebacate, 2-(2H-benzotriazol-2-yl)-4-(1,1,3,3-tetramethylbutyl)phenol, or the like, and may be used in an amount of 0.1 to 5 parts by weight or 0.5 to 2 parts by weight, preferably 0.5 to 1.5 parts by weight, with respect to 100 parts by weight of the total amount of (A), (B), (C), (D), and (E) components. Within this range, desired effects may be easily achieved without deteriorating the physical properties of the composition.

For example, when wear resistance is measured according to JIS K 7204:1999, the thermoplastic resin composition may have a wear resistance value of less than 4.0 mg or 3.2 mg or less, preferably 1.7 to 2.0 mg. Within this range, wear resistance may be improved.

For example, when gloss is measured according to ASTM D528 at a 45° angle, the thermoplastic resin composition may have a gloss of 45 or less, or 30 or less, 15 to 35, or 15 to 27, preferably 18.4 to 27.4. Within this range, when abrasion occurs, the abrasion may not be visually observed.

For example, when flexural strength is measured according to ASTM D790, the thermoplastic resin composition may have a flexural strength of 500 kgf/cm$^2$ or more, 510 to 690 kgf/cm$^2$, or 540 to 650 kgf/cm$^2$, preferably 560 to 643 kgf/cm$^2$. Within this range, impact resistance may be excellent.

For example, when tensile strength is measured according to ASTM D638, the thermoplastic resin composition may have a tensile strength of 300 kgf/cm$^2$ or more, 310 to 410 kgf/cm$^2$, or 330 to 380 kgf/cm$^2$, preferably 338 to 375 kgf/cm$^2$. Within this range, impact resistance may be excellent.

For example, the thermoplastic resin composition may be prepared by a method including a step of melt-kneading and extruding a) 5 to 35% by weight of a first graft copolymer having an average particle diameter of 50 to 150 nm and containing acrylate rubber as a core; b) 10 to 40% by weight of a second graft copolymer having an average particle diameter of more than 150 nm and 800 nm or less and containing acrylate rubber as a core; c) 5 to 15% by weight of an aromatic vinyl compound-vinyl cyanide compound copolymer having a weight average molecular weight of 70,000 to 130,000 g/mol; d) 20 to 50% by weight of an aromatic vinyl compound-(meth)acrylate compound copolymer having a weight average molecular weight of 65,000 to 100,000 g/mol; and e) 0.1 to 10% by weight of a syndiotactic polystyrene resin.

For example, when the thermoplastic resin composition is prepared, 0.1 to 3 parts by weight of the lubricant, 0.1 to 1 part by weight of the antioxidant, and 0.1 to 2 parts by weight of the ultraviolet light stabilizer may be further included.

The present invention provides a sheet containing the thermoplastic resin composition.

For example, the sheet may be a floor sheet.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Example 1

100 parts by weight of a base resin including 20% by weight of a first graft copolymer having an average particle diameter of 130 nm, in which 30% by weight of styrene and 20% by weight of acrylonitrile are graft-polymerized onto 50% by weight of a butyl acrylate rubber core; 25% by weight of a second graft copolymer having an average particle diameter of 500 nm, in which 30% by weight of styrene and 20% by weight of acrylonitrile are graft-polymerized onto 50% by weight of a butyl acrylate rubber core; 10% by weight of an aromatic SAN resin (98UHM resin, α-methylstyrene-styrene-acrylonitrile copolymer, manufactured by LG Chem.) having a weight average molecular weight of 100,000 g/mol; 42% by weight of a low molecular weight SAMMA resin (XT500 resin, manufactured by LG Chem.) having a weight average molecular weight of 85,000 g/mol; and 3% by weight of syndiotactic polystyrene (XAREC resin, Idemitsu Co.) having tacticity of 99% or more as a quencher, 1 part by weight of an EBS resin (SUNKOO Chem.) as a lubricant, 0.4 parts by weight of each of Irgranox 1076 and Irgrafos 168 (BASF Chem.) as antioxidants, and 0.6 parts by weight of each of ultraviolet light stabilizers, Tinuvin 770 (BASF Chem.) and Sunsorb 329 (SUNFINE GLOBAL Co.), were mixed. Then, the mixture was prepared into a pellet using an extrusion kneader at a cylinder temperature of 230° C., and the pellet was subjected to injection molding to prepare a thermoplastic resin composition specimen.

Example 2

Except that 30% by weight of the second graft copolymer, 36% by weight of the SAMMA resin, and 4% by weight of syndiotactic polystyrene were used, a thermoplastic resin composition specimen was prepared according to the same method as in Example 1.

Example 3

Except that 30% by weight of the second graft copolymer and 37% by weight of the SAMMA resin were used, a thermoplastic resin composition specimen was prepared according to the same method as in Example 1.

Example 4

Except that 15% by weight of the first graft copolymer and 27% by weight of the second graft copolymer were used, a thermoplastic resin composition specimen was prepared according to the same method as in Example 1.

Example 5

Except that 30% by weight of the first graft copolymer and 18% by weight of the second graft copolymer were used, a thermoplastic resin composition specimen was prepared according to the same method as in Example 1.

Comparative Example 1

Except that the second graft copolymer was not used and 50% by weight of the first graft copolymer, 35% by weight of the SAN resin (80HF resin, manufactured by LG Chem.) having a weight average molecular weight of 150,000 g/mol, 10% by weight of the SAMMA resin, and 5% by weight of syndiotactic polystyrene were used, a thermoplastic resin composition specimen was prepared according to the same method as in Example 1.

Comparative Example 2

Except that 20% by weight of a SAN resin having a weight average molecular weight of 150,000 g/mol was used instead of the aromatic SAN resin, and 25% by weight of the SAMMA resin and 5% by weight of syndiotactic polystyrene were used, a thermoplastic resin composition specimen was prepared according to the same method as in Example 1.

Comparative Example 3

Except that the aromatic SAN resin was not used, and 45% by weight of the SAMMA resin and 5% by weight of syndiotactic polystyrene were used, a thermoplastic resin composition specimen was prepared according to the same method as in Example 1.

Comparative Example 4

Except that 20% by weight of the aromatic SAN resin and 32% by weight of the SAMMA resin were used, a thermoplastic resin composition specimen was prepared according to the same method as in Example 1.

Comparative Example 5

Except that 16% by weight of the first graft copolymer, 20% by weight of the second graft copolymer, and 51% by weight of the SAMMA resin were used, a thermoplastic resin composition specimen was prepared according to the same method as in Example 1.

Comparative Example 6

Except that 37% by weight of the SAMMA resin and 8% by weight of syndiotactic polystyrene were used, a thermoplastic resin composition specimen was prepared according to the same method as in Example 1.

Test Example

The properties of the specimens prepared according to Examples 1 to 5 and Comparative Examples 1 to 6 were measured by the following methods, and the results are shown in Table 1.

Measurement Method

Weight average molecular weight (g/mol): drying was performed in an oven at 120° C. for 15 minutes to obtain a solid content, and the solid content was added to the THF solvent in an amount of 0.2% by weight to prepare a solution containing the solid content. Then, the solution was subjected to gel permeation chromatography (GPC) to measure weight average molecular weight.

Rubber content: was quantitatively measured according to FT-IR.

Average particle diameter (nm): weight-average particle was measured as an intensity value in a Gaussian mode using a NICOMP 380 Particle Size Analyzer according to a dynamic laser light scattering method.

Tacticity (%): was quantitatively measured according to 13 C-NMR.

Gloss: was measured at 45° angle according to ASTM D528.

Impact strength (¼"; kgf·cm/cm): was measured using ¼" specimens according to standard measurement ASTM D256.

Pencil hardness: was measured according to ASTM D2197.

Flexural strength (kgf/cm^2): was measured according to ASTM D790.

Tensile strength (kgf/cm^2): was measured according to ASTM D638.

Wear resistance (mg): A Taber 5700 Linear Abraser was used. Using Abrasion Wheel H-18, 60 cycles of friction were applied under a load of 500 g, and the degree of abrasion was measured.

Colorability: The L values (representing colorability) of specimens were measured using a colorimeter. The L value is proportional to the degree of brightness. For example, when a specimen exhibits low brightness and a dark black color, the specimen has a low L value, which means that the colorability of the specimen is good.

TABLE 1

| Classification | Example 1 | Example 2 | Example 3 | Example 4 | Example 5 |
|---|---|---|---|---|---|
| First graft copolymer | 20 | 20 | 20 | 15 | 30 |
| Second graft copolymer | 25 | 30 | 30 | 27 | 18 |
| Aromatic SAN resin | 10 | 10 | 10 | 10 | 10 |
| SAN resin | — | — | — | — | — |
| SAMMA resin | 42 | 36 | 37 | 42 | 42 |
| Rubber content | 22.5 | 25 | 25 | 22.5 | 22.5 |
| Quencher | 3 | 4 | 3 | 3 | 3 |
| Gloss | 27.4 | 18.4 | 25.8 | 36.4 | 43.9 |
| Impact strength (¼") | 5.9 | 6.74 | 7.46 | 7.07 | 6.44 |
| Pencil hardness | F | HB | HB | HB | HB |

TABLE 1-continued

| Classification | Example 1 | Example 2 | Example 3 | Example 4 | Example 5 |
|---|---|---|---|---|---|
| Flexural strength | 643 | 560 | 570 | 646 | 687 |
| Tensile strength | 375 | 338 | 339 | 381 | 404 |
| Wear resistance | 1.7 | 2.0 | 3.2 | 1.8 | 3.0 |
| Colorability | 95.869 | 95.661 | 95.733 | 95.563 | 95.685 |

TABLE 2

| Classification | Comparative Example 1 | Comparative Example 2 | Comparative Example 3 | Comparative Example 4 | Comparative Example 5 | Comparative Example 6 |
|---|---|---|---|---|---|---|
| First graft copolymer | 50 | 20 | 20 | 20 | 16 | 20 |
| Second graft copolymer | — | 30 | 30 | 25 | 20 | 25 |
| Aromatic SAN resin | — | — | — | 20 | 10 | 10 |
| SAN resin | 35 | 20 | — | — | — | — |
| SAMMA resin | 10 | 25 | 45 | 32 | 51 | 37 |
| Rubber content | 25 | 25 | 25 | 22.5 | 18 | 22.5 |
| Quencher | 5 | 5 | 5 | 3 | 3 | 8 |
| Gloss | 22.3 | 27.9 | 25.1 | 22.4 | 25.4 | 17.1 |
| Impact strength (¼") | 8.28 | 8.11 | 6.72 | 8.35 | 5.88 | 2.6 |
| Pencil hardness | HB | HB | HB | HB | HB | F |
| Flexural strength | 481 | 523 | 542 | 645 | 661 | 643 |
| Tensile strength | 299 | 320 | 327 | 376 | 317 | 375 |
| Wear resistance | 4.0 | 3.8 | 3.5 | 2.1 | 2.2 | 2.7 |
| Colorability | 95.491 | 96.296 | 96.374 | 95.630 | 95.889 | 95.713 |

As shown in Tables 1 and 2, Examples 1 to 5 exhibited excellent flexural strength, tensile strength, pencil hardness, and colorability as compared with Comparative Examples 1 to 6. In particular, wear resistance was remarkably improved.

In addition, compared to Example 1, Examples 2 and 3 in which the amount of the second graft copolymer was increased exhibited excellent impact strength.

In addition, in the cases of Example 4 in which the weight ratio of the first graft copolymer to the second graft copolymer is 1:1.8 and Example 5 in which the weight ratio of the first graft copolymer to the second graft copolymer is 1:0.6, mechanical properties, such as flexural strength and tensile strength, was excellent, and particularly, wear resistance was improved.

In addition, in the case of Comparative Example 1 in which a SAN resin having a weight average molecular weight of 150,000 g/mol was used instead of the second graft copolymer and the aromatic SAN resin, as compared with Examples, flexural strength and tensile strength was reduced, and particularly, wear resistance was deteriorated.

In addition, in the case of Comparative Example 2 in which a SAN resin having a weight average molecular weight of 150,000 g/mol was used and Comparative Example 3 in which the aromatic SAN resin was not used, as compared with Examples, flexural strength, tensile strength, wear resistance, and colorability were deteriorated.

In addition, in the case of Comparative Example 4 in which 20% by weight of the aromatic SAN resin and 32% by weight of the SAMMA resin were used, compared with Example 1, wear resistance was reduced.

In addition, in the case of Comparative Example 5 in which 51% by weight of the SAMMA resin was used, impact strength was reduced due to a decrease in rubber content, and colorability was deteriorated. In Comparative Example 6 in which 8% by weight of a quencher was used, as compared with Examples, impact strength was significantly reduced.

The invention claimed is:

1. A thermoplastic resin composition, comprising:
   (A) 5 to 35% by weight of a first graft copolymer having an average particle diameter of 50 to 150 nm and containing acrylate rubber as a core;
   (B) 10 to 40% by weight of a second graft copolymer having an average particle diameter of more than 150 nm and 800 nm or less and containing acrylate rubber as a core;
   (C) 5 to 15% by weight of an aromatic vinyl compound-vinyl cyanide compound copolymer having a weight average molecular weight of 70,000 to 130,000 g/mol;
   (D) 20 to 50% by weight of an aromatic vinyl compound-(meth)acrylate compound copolymer having a weight average molecular weight of 65,000 to 100,000 g/mol; and
   (E) 0.1 to 7% by weight of a resin selected from syndiotactic polystyrene, a derivative of syndiotactic polystyrene, or a mixture thereof.

2. The thermoplastic resin composition according to claim 1, wherein the acrylate rubbers in parts A and B are alkyl acrylate rubber.

3. The thermoplastic resin composition according to claim 2, wherein the alkyl acrylate rubber is acrylate rubber having an alkyl group having 1 to 10 carbon atoms.

4. The thermoplastic resin composition according to claim 1, wherein the first graft copolymer is obtained by graft-polymerizing 20 to 60% by weight of an aromatic vinyl compound and 5 to 40% by weight of a vinyl cyanide compound onto 30 to 70% by weight of an acrylate rubber core.

5. The thermoplastic resin composition according to claim 1, wherein the second graft copolymer is obtained by graft-polymerizing 20 to 60% by weight of an aromatic vinyl compound and 5 to 40% by weight of a vinyl cyanide compound onto 30 to 70% by weight of an acrylate rubber core.

6. The thermoplastic resin composition according to claim 1, wherein the total content of rubber contained in the first graft copolymer and the second graft copolymer is 10 to 30% by weight with respect to 100% by weight of the total thermoplastic resin composition.

7. The thermoplastic resin composition according to claim 1, wherein a weight ratio of the first graft copolymer to the second graft copolymer is 1:0.5 to 1:2.

8. The thermoplastic resin composition according to claim 1, wherein the aromatic vinyl compound-vinyl cyanide compound copolymer is one or more selected from the group consisting of a styrene/acrylonitrile copolymer, an α-methylstyrene/acrylonitrile copolymer, an α-methylstyrene/styrene/acrylonitrile copolymer, a styrene/methyl methacrylate copolymer, and a styrene/maleic anhydride copolymer.

9. The thermoplastic resin composition according to claim 1, wherein the aromatic vinyl compound-vinyl cyanide compound copolymer comprises 10 to 50% by weight of a vinyl cyanide compound.

10. The thermoplastic resin composition according to claim 1, wherein the aromatic vinyl compound-(meth)acrylate compound copolymer is obtained by polymerizing 65 to 85% by weight of a (meth)acrylate compound and 15 to 35% by weight of an aromatic vinyl compound.

11. The thermoplastic resin composition according to claim 1, wherein the (meth)acrylate compound is one or more selected from the group consisting of methyl acrylate, ethyl acrylate, methyl methacrylate, ethyl methacrylate, methyl ethacrylate, ethyl ethacrylate, propyl acrylate, isopropyl acrylate, butyl acrylate, propyl methacrylate, isopropyl methacrylate, butyl methacrylate, and isobutyl methacrylate.

12. The thermoplastic resin composition according to claim 1, further comprising one or more additives selected from the group consisting of an anti-dripping agent, a flame retardant, an antimicrobial agent, an antistatic agent, a stabilizer, a release agent, a heat stabilizer, an inorganic additive, a lubricant, an antioxidant, a light stabilizer, a pigment, a dye, and an inorganic filler.

13. The thermoplastic resin composition according to claim 1, wherein, when wear resistance is measured according to JIS K 7204:1999, the thermoplastic resin composition has a wear resistance value of less than 4.0 mg.

14. A method of preparing a thermoplastic resin composition, comprising:
a step of melt-kneading and extruding a) 5 to 35% by weight of a first graft copolymer having an average particle diameter of 50 to 150 nm and containing acrylate rubber as a core; b) 10 to 40% by weight of a second graft copolymer having an average particle diameter of more than 150 nm and 800 nm or less and containing acrylate rubber as a core; c) 5 to 15% by weight of an aromatic vinyl compound-vinyl cyanide compound copolymer having a weight average molecular weight of 70,000 to 130,000 g/mol; d) 20 to 50% by weight of an aromatic vinyl compound-(meth)acrylate compound copolymer having a weight average molecular weight of 65,000 to 100,000 g/mol; and e) 0.1 to 7% by weight of a syndiotactic polystyrene resin.

15. A sheet prepared using the composition according to claim 1.

* * * * *